United States Patent
Tsirkin et al.

(10) Patent No.: US 9,875,047 B2
(45) Date of Patent: Jan. 23, 2018

(54) EXIT-LESS HOST MEMORY LOCKING IN A VIRTUALIZED ENVIRONMENT

(71) Applicant: Red Hat Israel, Ltd., Raanana (IL)

(72) Inventors: Michael Tsirkin, Yokeneam Yillit (IL); Andrea Arcangeli, Imola (IT)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 14/723,203

(22) Filed: May 27, 2015

(65) Prior Publication Data
US 2016/0350018 A1    Dec. 1, 2016

(51) Int. Cl.
*G06F 3/06*    (2006.01)

(52) U.S. Cl.
CPC .......... *G06F 3/0622* (2013.01); *G06F 3/0637* (2013.01); *G06F 3/0664* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 6,496,909 B1 * | 12/2002 | Schimmel | G06F 12/10 710/200 |
| 6,886,085 B1 * | 4/2005 | Shuf | G06F 9/30047 711/143 |
| 7,065,630 B1 | 6/2006 | Ledebohm et al. | |
| 7,409,525 B1 | 8/2008 | Clark et al. | |
| 7,421,533 B2 | 9/2008 | Zimmer et al. | |
| 7,467,324 B1 * | 12/2008 | Davda | G06F 11/0715 711/162 |
| 7,500,048 B1 | 3/2009 | Venkitachalam et al. | |
| 7,613,898 B2 | 11/2009 | Haertel et al. | |
| 7,702,826 B2 | 4/2010 | Oztaskin et al. | |
| 7,984,108 B2 | 7/2011 | Landis et al. | |
| 8,145,470 B2 | 3/2012 | Green | |
| 8,307,169 B2 | 11/2012 | Elteto | |
| 8,392,628 B2 | 3/2013 | Santos et al. | |
| 8,938,571 B1 | 1/2015 | Vincent | |
| 8,954,959 B2 | 2/2015 | Tsirkin et al. | |
| 8,984,478 B2 | 3/2015 | Epstein | |
| 2005/0235123 A1 * | 10/2005 | Zimmer | G06F 12/126 711/170 |

(Continued)

OTHER PUBLICATIONS

Kehayias, Jonathan, "Great SQL Server Debates: Lock Pages in Memory", Dec. 12, 2011, 5 pages.

(Continued)

*Primary Examiner* — David X Yi
*Assistant Examiner* — Ramon A Mercado
(74) *Attorney, Agent, or Firm* — Lowenstein Sandler LLP

(57) ABSTRACT

Embodiments of the present disclosure enable exit-less host memory locking in a virtualized environment. An example method comprises protecting, by a processing device of a host computer system, a memory page from being accessed by a guest operating system of a virtual machine running on the host computer system. The locking indicator resides in a shared memory accessible by the guest operating system. Responsive to determining that the locking indicator indicates that the memory page is not in a locked state, the memory page is accessed. Thereafter, access to the memory page is re-enabled for the guest operating system.

20 Claims, 5 Drawing Sheets

(56) References Cited

U.S. PATENT DOCUMENTS

| | | | | |
|---|---|---|---|---|
| 2006/0075402 A1* | 4/2006 | Neiger | G06F 9/45558 | 718/1 |
| 2009/0037936 A1* | 2/2009 | Serebrin | G06F 12/0292 | 719/318 |
| 2012/0072906 A1* | 3/2012 | Tsirkin | G06F 12/1009 | 718/1 |
| 2013/0013877 A1 | 1/2013 | Tian | | |
| 2013/0091500 A1 | 4/2013 | Earl et al. | | |
| 2013/0145073 A1 | 6/2013 | Tuch et al. | | |
| 2013/0326179 A1* | 12/2013 | Tsirkin | G06F 9/5016 | 711/163 |
| 2014/0068612 A1* | 3/2014 | Torrey | G06F 9/45558 | 718/1 |
| 2014/0283056 A1* | 9/2014 | Bachwani | G06F 21/56 | 726/23 |
| 2015/0039838 A1* | 2/2015 | Tarasuk-Levin | G06F 12/0862 | 711/137 |
| 2016/0110291 A1* | 4/2016 | Gordon | G06F 12/126 | 711/6 |
| 2016/0148001 A1* | 5/2016 | Bacher | G06F 9/45558 | 713/189 |
| 2016/0171034 A1* | 6/2016 | Konik | G06F 17/30463 | 707/803 |
| 2016/0267051 A1 | 9/2016 | Metzler et al. | | |

OTHER PUBLICATIONS

Otey, Michael, "Using Hyper-V Dynamic Memory with SQL Server", Jul. 19, 2012, 8 pages.

Gordon, Abel et al., "Towards Exitless and Efficient Paravirtual I/O", Jun. 4-6, 2012, IBM Research—Haifa, 6 pages.

Iommu Architectural Specification, "AMD I/O Virtualization Technology (IOMMU) Specification", http://developer.amd.com/wordpress/media/2012/10/34434-IOMMU-Rev_1.26_2-11-09.pdf, Feb. 2009, 90 pages.

Willmann, Paul et al., "Protection Strategies for Direct Access to Virtualized I/O Devices", https://www.usenix.org/legacy/events/usenix08/tech/full_papers/willmann/willmann_html/index.html, 2008, 24 pages.

"Intel® Virtualization Technology for Directed I/O", http://www.csit-sun.pub.ro/~cpop/Documentatie_SM/Intel_Microprocessor_Systems/Intel%20TechnologyNew/Intel(r)_VT_for_Direct_IO.pdf, Sep. 2008, 152 pages.

* cited by examiner

EXIT-LESS HOST MEMORY LOCKING IN A VIRTUALIZED ENVIRONMENT

TECHNICAL FIELD

The present disclosure is generally related to virtualized computer systems, and is more specifically related to systems and methods for exit-less host memory locking in a virtualized environment.

BACKGROUND

A virtual machine (VM) is a portion of software that, when executed on appropriate hardware, creates an environment that allows for a virtualization of various resources of an actual physical computer system (e.g., a server, a mainframe computer, etc.). The actual physical computer system is typically referred to as a "host machine," and the operating system of the host machine is typically referred to as the "host operating system." On the host machine, a virtual machine monitor known as a "hypervisor" manages the execution of one or more virtual machines. The virtual machine monitor provides a variety of functions, such as allocating and executing request by the virtual machines for the various resources of the host machine.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

The present disclosure is illustrated by way of examples, and not by way of limitation, and may be more fully understood with references to the following detailed description when considered in connection with the figures, in which.

DETAILED DESCRIPTION

Figure 1:
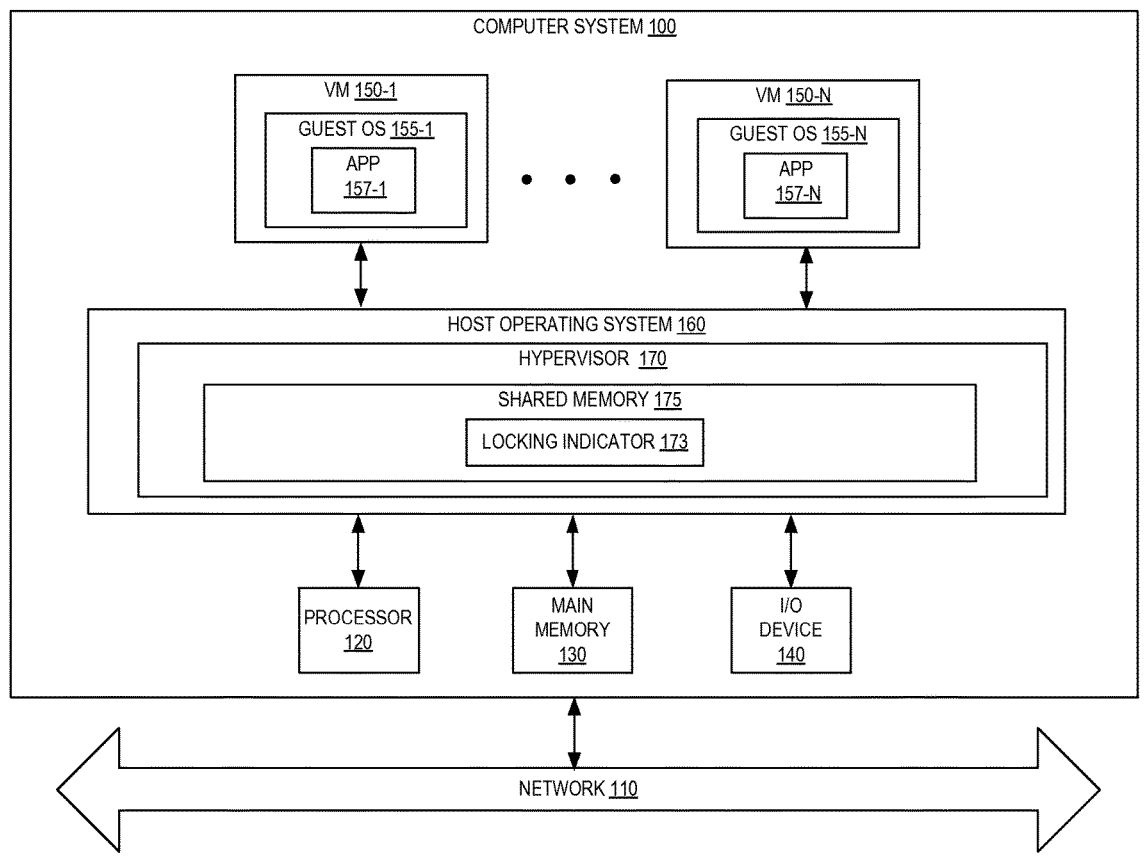
FIG. 1 depicts a high-level component diagram of an example computer system in accordance with one or more aspects of the present disclosure.

Described herein are techniques for a "guest" operating system of a virtual machine to lock a memory page of main memory managed by a "host," such as a hypervisor, by directly modifying a data structure (e.g., locking indicator) in a shared memory location to indicate that the memory page is locked. The guest may use memory locking to protect certain memory contents (e.g., a password, private encryption key, etc.) from being copied out of main memory, for example, by the hypervisor. Another use for memory locking is in real-time application, which cannot support latency involved when memory pages are moved around.

Guests are allocated memory by the hypervisor to a virtual memory space. The virtual memory space includes memory pages that map to physical memory pages in the main memory. In some systems, the hypervisor can transparently "swap out" a portion of this virtual memory space from the main memory. For example, when system memory resources are low, the hypervisor may swap out or copy some of the memory pages mapped to a guest onto an external storage device. In some situations, the guest may send a request to the hypervisor to lock the memory pages that have been allocated. In response, the hypervisor may "pin" the underlying physical memory pages so that they cannot be swapped out of main memory. As for current practice, however, the hypervisor either locks all or none of guest memory pages. For many guests, locking all of the guest memory pages is excessive. Moreover, this type of locking may reduce the number of guests that can run on the host.

In accordance with embodiments of the present disclosure, to lock a portion of guest memory, the guest may mark one or more memory pages as locked in a locking indicator. The locking indicator resides in a memory location that is shared with the host. This locking indicator may include address information for specific memory pages allocated to the guest by the host. For example, the locking indicator may include virtual addresses of guest memory pages that map to physical addresses in main memory. In one embodiment, the guest may look up an entry associated with the locking indicator for a match to an address of the memory page. For example, a virtual address for the memory page may be matched to an address field in the locking indicator. When the correct entries are located, the guest may set the locking indicator for the corresponding memory pages. After setting the locking indicator for individual memory pages, the guest may access those memory pages knowing that they cannot be swapped out or otherwise copied by the host.

In operation, before trying to operate on a memory page allocated to the guest (e.g., before copying the page to disk), the host may protect the memory page from access by the guest. For example, the host may clear a certain bit (e.g., the "present" bit) in a page table entry associated with the memory page. In this regard, clearing of the "present" bit makes the memory page not-present, e.g., protected. Then, the locking indicator associated with the memory page is checked by the host for modifications thereto. For example, a determined bit associated with the locking indicator may be inspected by the host for modifications. If the locking indicator is set, then the guest has indicated that the memory page is in the locked state. Otherwise, for example, if the locking indicator is clear, then the memory page is not in the locked state.

If the memory page is not in the locked state, then the host may access the memory page. For example, the host may evict the memory page from memory. If the memory page is in the locked state, the host considers the memory page as locked and skips access to the memory page. Thereupon, the host re-enables access for the guest to the memory page either immediately, for example, by clearing the bit in the page table entry or "lazily" after the access. For example, re-enabling lazily is re-enabling access for the guest after the host accesses the memory page. Thereafter, the guest may access the memory page, thus forcing the memory page into the random access memory (RAM) if the memory page is not there already. Embodiments of the present disclosure thus provide guests with the capability of locking a portion of guest memory without exiting to the host. That is, no explicit host notification is executed that may lock all of the guest memory, thus the guest has greater control over guest memory to which the host allocates.

FIG. 1 depicts a high-level component diagram of an exemplary computer system 100 that may be used to implement one or more aspects of the present disclosure. As shown, the computer system 100 may be coupled to a network 110 include a processor 120 communicatively coupled to a main memory 130 and input/output (I/O) devices 140 via, for example, a system bus.

"Processor" herein refers to a device capable of executing instructions encoding arithmetic, logical, or I/O operations. In one illustrative example, a processor may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data. Although, for simplicity, a single processor 120 is depicted in FIG. 1, in some other embodiments computer system 100 may comprise a plurality of processors. Similarly, in some other embodiments computer system 100 may comprise a plurality of I/O devices, rather than a single I/O device 140.

The computer system 100 may be a server, a mainframe, a workstation, a personal computer (PC), a mobile phone, a palm-sized computing device, etc. The network 110 may be a private network (e.g., a local area network (LAN), a wide area network (WAN), intranet, etc.) or a public network (e.g., the Internet). Computer system 100 may run "host" software, such host operating system 160, that manages the hardware resources of the computer system and that provides functions such as interprocess communication (IPC), scheduling, memory management, and so forth. In one embodiment, the host operating system 160 may also comprises a hypervisor 170 also known as a virtual machine monitor (VMM), which may be software that provides a virtual operating platform for the set of virtual machines (VMs) 150-1 through 150-N, and manages the execution of these virtual machines.

Hypervisor 170 may take many forms. For example, hypervisor 170 may be part of or incorporated in the host operating system 160 of computer system 110, or hypervisor 170 may be running on top of the host operating system 160. Alternatively, hypervisor 170 may a "bare metal" hypervisor that runs on hardware of computer system 110 without an intervening operating system. The hypervisor 170 may abstract the physical layer of computer system 100, including processor 120, main memory 130, and I/O device 140, and present this abstraction to VMs 150-1 through 150-N as virtual devices. The hypervisor 170 may support multiple VMs residing on the computer system 100. In some embodiments, more than one hypervisor (not shown) may be provided to support the VMs of the computer system 100.

Each virtual machine (VM) of the VMs may be a software implementation of a machine that executes programs as though it were an actual physical machine. Each virtual machine may execute a "guest" operating system and other types of software and/or applications. The hypervisor 170 can either handle request by the VMs for machine resources, or forward the request to the host operating system 160, as well as various faults and interrupts.

The hypervisor 170 allocates memory from the main memory 130 to the VMs 150-1 through 150-N to be used, for example, by a corresponding guest OS 155-1 through 155-N and application (app) 157-1 through 157-N. In one embodiment, a guest OS, such as guest OS 155-1, may lock a portion of this allocated host memory by modifying a data structure in memory that is shared with the hypervisor 170. In some embodiments, the hypervisor 170 may maintain a locking indicator 173, which may be a data structure that includes but is not limited to a table. The locking indicator 173 may be stored in a shared memory 175 that is accessible by a specific VM, such as VM 150-1 of guest OS 155-1. The locking indicator 173 may be used to keep track of memory pages that have been locked by a guest OS of the VMs. A memory access instruction from a particular guest OS to modify the locking indicator 173 may be placed directly in the shared memory 173 by a corresponding VM, thereby bypassing the hypervisor 170. These modifications to the locking indicator 173 may indicate which specific memory pages the guest OS has locked.

In one embodiment, before accessing guest memory for a hypervisor operation (for example, before copying the guest memory to disk), hypervisor 170 protects a memory page for access by the guest. Then, the hypervisor 170 checks locking indicator 173 for modifications. If the locking indicator 173 indicates memory pages are marked as locked by the guest OS, the hypervisor 170 considers the pages as locked and skips access to them. For example, the hypervisor 170 may choose another memory page to swap out to disk or may retry access to the memory page at a later time. Otherwise, the hypervisor 170 may access the memory pages. Page access for the guest OS is re-enabled later (for example, immediately or lazily after access).

In some embodiments, the hypervisor 170 can be configured so that the amount of memory locked by the guest OS does not exceed a set threshold number of memory pages. If the number of memory pages marked in locking indicator 173 for a given guest OS exceeds the set threshold number, hypervisor 170 may shut down the corresponding VM associated with the guest OS. This is merely one example of a way to handle a guest OS that may violate a memory lock limit as other techniques may be possible to ensure that a guest OS stays within the set limits.

Figure 2:
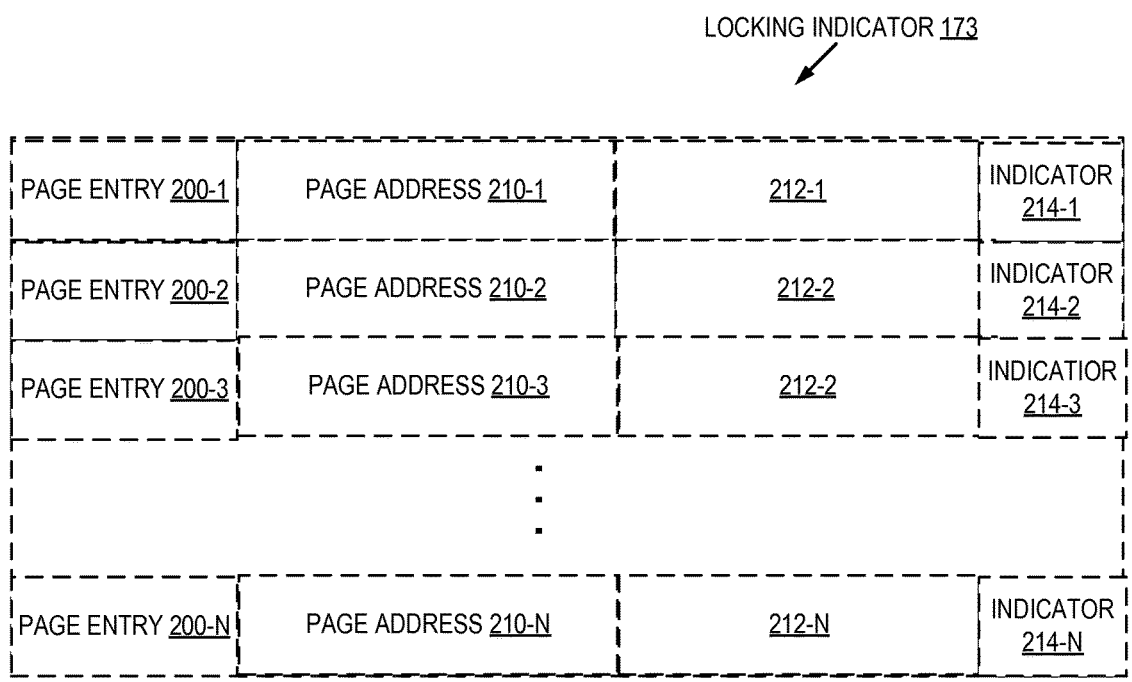
FIG. 2 depicts the data structure of FIG. 1 in accordance with one or more aspects of the present disclosure.

FIG. 2 depicts the locking indicator 173 of FIG. 1, which can be used in one or more embodiments. As shown, the locking indicator 173 includes a plurality of page entries 200-1 through 200-N, such as from a "page table." A page table is a data structure used by a computer operating system in virtual memory system, such as in the host operating system 160 of computer system 100. The page table maintains a mapping between virtual addresses and physical addresses. For example, the virtual address of the page table may be associated with a memory page of a guest OS, such as anyone of guest OS 155-1 through 155-N), and this address may map to a physical address location associated with main memory 130. In some embodiments, the locking indicator 173 is a page table of computer system 100. In other embodiments, the locking indicator 173 may use a guest page table or other kinds of native or created tables in computer system 100 where a mapping between virtual addresses and physical addresses are maintained. Each page entry within the locking indicator 173 comprises information related to the memory page. For example, the page entries 200-1-200-N may include page address fields 210-1-210-N that respectively represents an address for a memory page of a guest OS, lock indicators 212-1-212-N, as well as other types of relevant information 214-1-214-N.

As suggested by the name, the lock indicators 212-1 through 212-N indicate whether the respective memory pages are considered locked by a guest OS. The lock indicators 212-1-212-N may comprise various kinds of data types, such as a bit, a byte, a word, etc., which may be set to a value that indicates the page is locked. For example, when the guest OS wants to indicate that a memory page is locked (e.g., in a locked state), a memory access instruction may be sent directly to the locking indicator 173 to modify or otherwise set the lock indicator associated with the page entry for the page. When the guest OS wants to indicate that a memory page is unlocked (e.g., not in a locked state), a different modification request may be sent directly to the locking indicator 173 in order to clear the indicator.

An alternative to using a separate indicator field, the lock indicator information may be included in the page address fields 210-1-210-N. For example, page address fields 210-1-210-N may include extra information like an extra bit. A guest OS may set this extra bit to indicate that the host memory represented by the page address is locked. Still further, an indication of whether the page is locked may alternatively be specified using some separate data pointer that is associated with the locking indicator 173. In an alternative embodiment, the locking indicator 173 may be a guest page table, and a used bit in the guest page table may be employed as the lock indicator.

Figure 3:
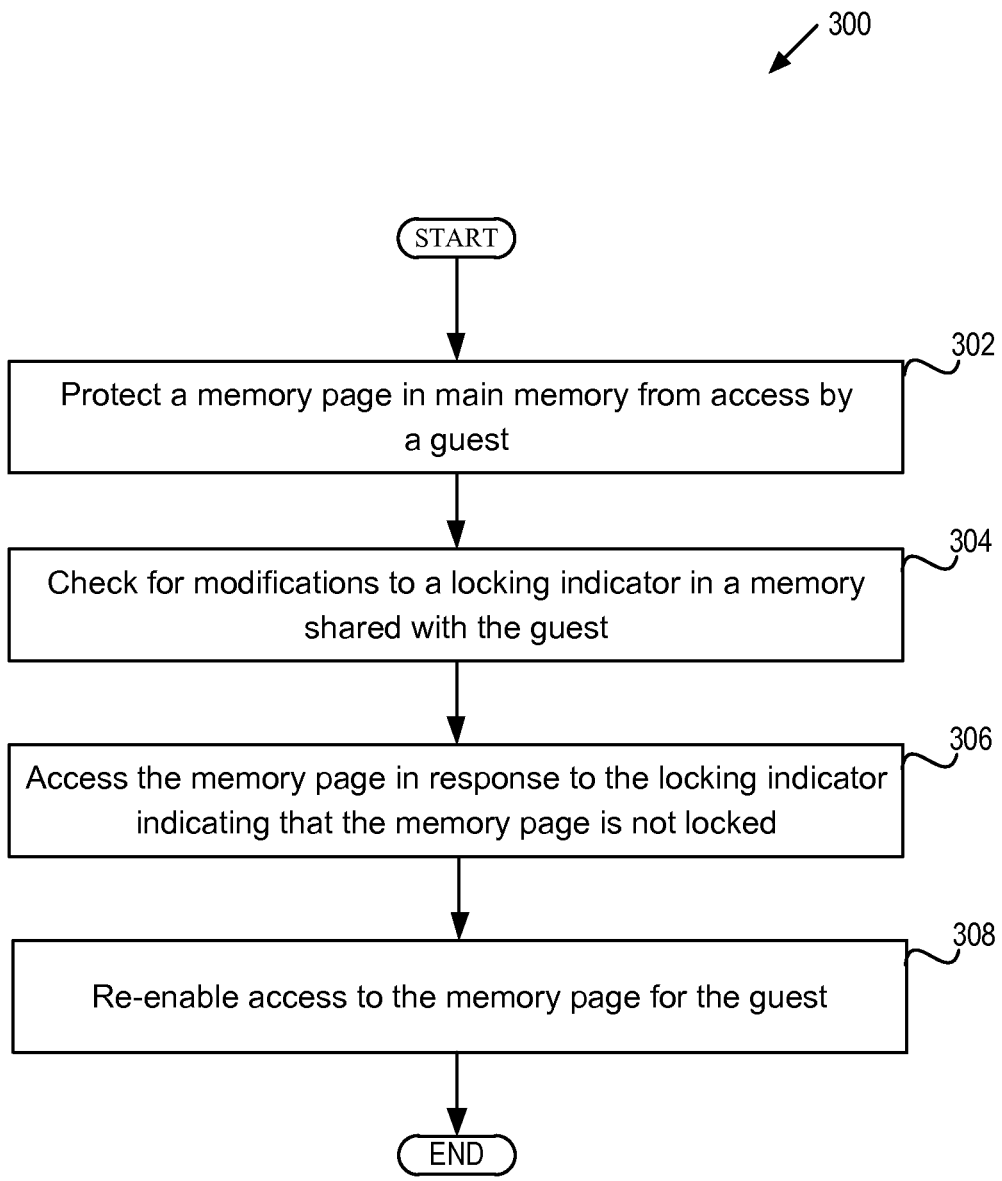
FIG. 3 depicts a flow diagram of a method in accordance with one or more aspects of the present disclosure.

FIG. 3 depicts a flow diagram of one embodiment of a method 300 in accordance with one or more aspects of the present disclosure. In one embodiment, the hypervisor 170 of FIG. 1 may perform method 300 in order to determine whether a guest OS has locked a portion of host memory. The method 300 may be performed by processing logic associated with the hypervisor 150 that may comprise hardware (circuitry, dedicated logic, etc.), software (such as is run on a general purpose computer system or a dedicated machine), or a combination of both. Alternatively, in some other embodiments, some or all of the method 300 might be performed by other components of computer system 100, such as processor 120. It should be noted that blocks depicted in FIG. 3 can be performed simultaneously or in a different order than that depicted.

At block 302, a memory page may be protected from access by a guest OS. This may be a memory page that the hypervisor 170 intends to access, for example, to copy to disk. To protect the memory page, the hypervisor 170 may block or otherwise prevent a memory access by the guest OS to a memory location associated with the memory page. The hypervisor 170 may clear a bit in a page table entry associated with the memory page. The bit indicates that the memory page is writeable, or readable, or both. If the guest accesses the page while it is protected, this causes a page-fault trap to the hypervisor, which would then re-enable access after completing the hypervisor accesses.

At block 304, a locking indicator in a memory shared with the guest OS may be checked for modifications. For example, hypervisor 170 may check locking indicator 173 in shared memory 175. The hypervisor 170 may identify an entry in the locking indicator 173. The entry may include a memory address associated with the memory page that was protected in block 302. For example, the hypervisor 170 may use a virtual memory address for the memory page to identify the entry. Once the entry is identified, information associated with the entry may be examined to determine if the memory page is not locked.

At block 306, the memory page may be accessed in response to the locking indicator indicating that the memory page is not locked. For example, locking indicator 173 may comprise a bit associated with the entry that can be set or cleared to indicate that the memory page is either locked or not locked, respectively. If the bit is not set, this indicates that the memory page is not locked by a guest OS. As a result, the hypervisor 170 may access the memory page. Otherwise, the hypervisor 170 may skip assess to this memory page.

At block 308, access to the memory page for the guest OS may be re-enabled. For example, hypervisor 170 may clear the bit in the page table entry associated with the memory page. This may occur either immediately or lazily after the memory page has been accessed by the hypervisor 170. Thereafter, the guest OS may access the memory page, thus forcing the memory page into RAM if the memory page is not there already.

Figure 4:
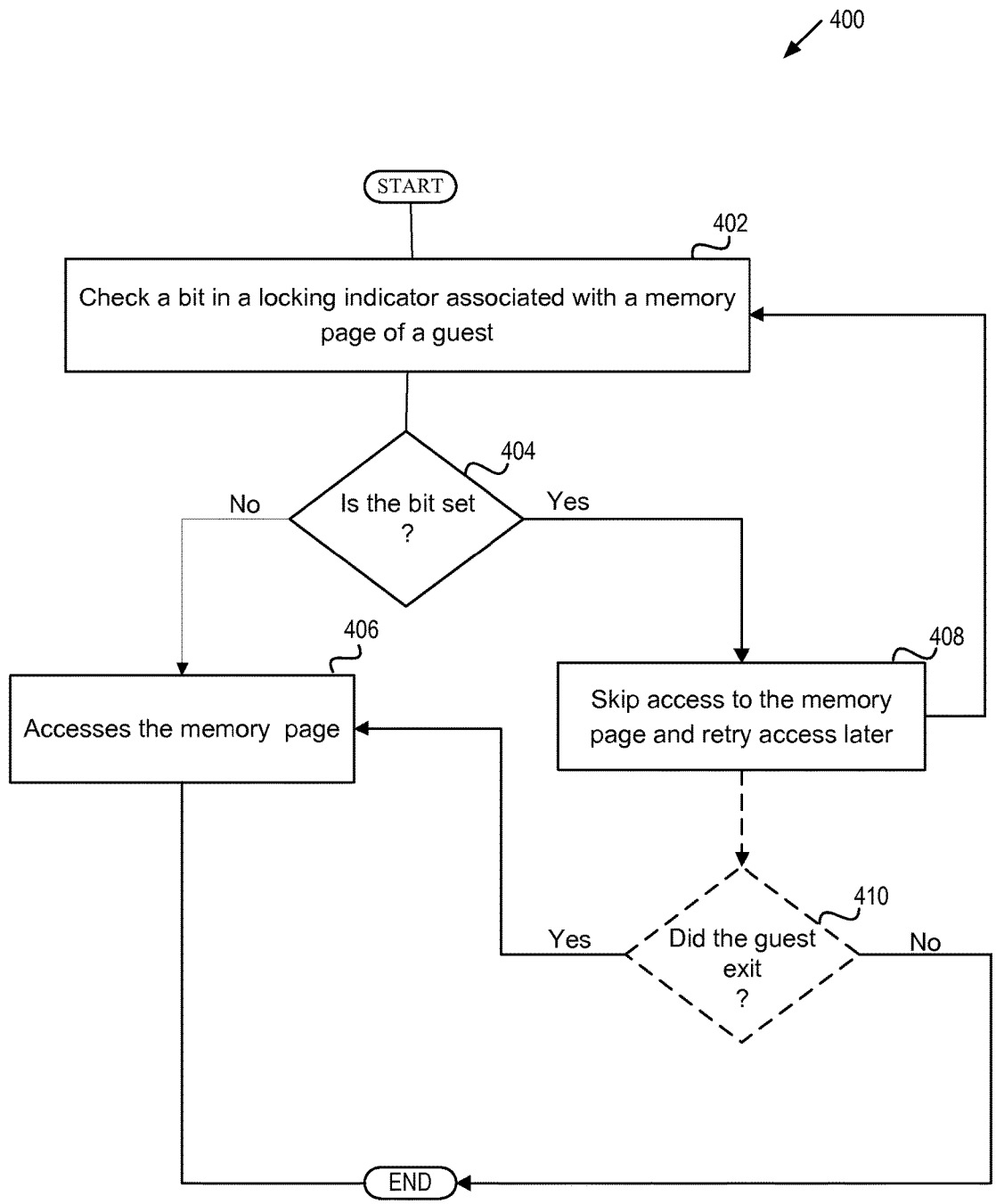
FIG. 4 depicts a flow diagram of another method in accordance with one or more aspects of the present disclosure.

FIG. 4 depicts a flow diagram of another method 400 in accordance with one or more aspects of the present disclosure. In one embodiment, the hypervisor 170 of FIG. 1 may perform method 400 in order to determine whether to access a portion of host memory allocated to a guest OS. Method 400 may be performed by processing logic associated with the hypervisor 170 that may comprise hardware (circuitry, dedicated logic, etc.), software (such as is run on a general purpose computer system or a dedicated machine), or a combination of both. Alternatively, in some other embodiments, some or all of the method 400 might be performed by other components of computer system 100, such as processor 120. It should be noted that blocks of depicted in FIG. 4 can be performed simultaneously or in a different order than that depicted.

At block 402, the hypervisor 170 may check a bit in a locking indicator associated with a memory page of a guest OS. For example, the bit may be in an entry of the locking indicator that is associated with an address for the memory page. At block 404, the hypervisor 170 may determine if the bit is set. For example, if the bit is set this indicates that the memory page is locked. If the bit is not set, then the memory page is unlocked and method 400 may proceed to block 406 where hypervisor 170 may access the memory page, e.g., evict the memory page from memory. Otherwise, the hypervisor determines that the bit is set and the memory page is considered locked. Method 400 may then proceed to block 408 where hypervisor 170 may skip access to the memory page and retry access at a later time by returning to block 402. In some embodiments, after a period of time has passed, method 400 may optionally proceed to block 410 rather than continually retry access.

Block 410 branches depending on whether the guest OS optionally exited. For example, to avoid retrying by the hypervisor 170 at block 408, the guest OS can also optionally exit to the hypervisor 170 (e.g., using a hypervisor call or I/O memory request). In some embodiments, that guest can exit after executing a batch of operations, for example, after unlocking X megabytes of memory. Such exits may be performed upon a certain timeout expiration and/or after a certain number of unlock requests. This makes the continual retrying by the hypervisor 170 at block 408 an inexpensive and non-fast-path operation, which does not cause a serialization conflict between the guest OS and the hypervisor 170. If it is determined that guest OS has exited, method 400 may proceed to block 406, so that the hypervisor 170 may access the newly unlocked page. Otherwise, method 400 may end. It should be noted that this feature is optional. For example, both the guest OS and the hypervisor 170 may check before execution to determine whether this feature was enabled for the corresponding VM by an administrative instruction, e.g., issued by a hypervisor admin.

Figure 5:
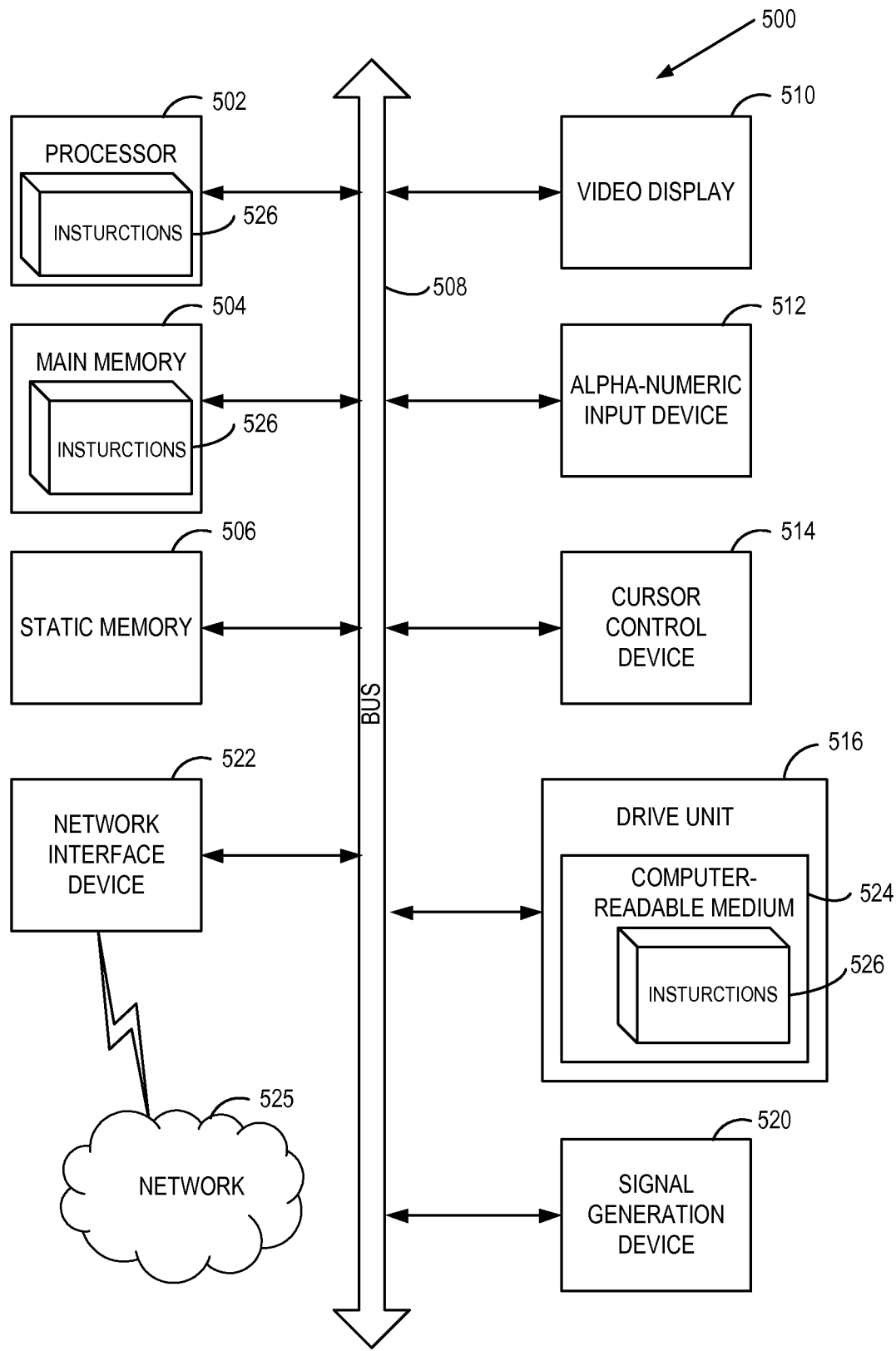
FIG. 5 depicts a block diagram of an example computer system operating in accordance with one or more aspects of the present disclosure.

FIG. 5 depicts an example computer system 500 which can perform any one or more of the methods described herein. In one example, computer system 500 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a drive unit 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions that may include instructions to execute instructions 526 for performing the operations and steps discussed herein. For example, in one embodiment, the instructions 526 may perform flow diagram 300 of FIG. 3 and flow diagram 400 for FIG. 4.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The drive unit 516 or secondary memory may include a computer-readable medium 524 on which is stored one or more sets of instructions 526 (e.g., instructions for the instructions 526) embodying any one or more of the methodologies or functions described herein. Instructions for the instructions 526 may also reside, completely or at least partially, within the main memory 504 and/or within the processor 502 during execution thereof by the computer system 500, the main memory 504 and the processor 502 also constituting computer-readable media. Instructions 526 may further be transmitted or received over a network via the network interface device 522. The instructions 526 may further be transmitted or received over a network 525 via the network interface device 522.

The non-transitory computer-readable storage medium 524 may also be used to store the instructions 526 persistently. While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, non-transitory computer-readable storage mediums, solid-state memories, optical media, and magnetic media.

The instructions 526, components and other features described herein can be implemented as discrete hardware components or integrated in the functionality of hardware components such as ASICS, FPGAs, DSPs or similar devices. In addition, the instructions 526 can be implemented as firmware or functional circuitry within hardware devices. Further, the instructions 526 can be implemented in a combination hardware devices and software components. For example, the functionality of this module can exist in a fewer or greater number of modules than what is shown, with such modules residing at one or more computing devices that may be geographically dispersed. The modules may be operable in conjunction with network 525 from which it may receive and provide relevant information regarding geometries.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "allocating", "notifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
   accepting, by a processing device of a host computer system from a guest operating system of a virtual machine running on the host computer system, a lock of a memory page located in memory shared with the guest operating system, wherein accepting the lock comprises allowing the guest operating system to set a locking indicator associated with the memory page without exiting to the host computer system, and wherein the locking indicator comprises a bit in a page table entry associated with the memory page, wherein the page table entry is of a page table of the host computer system;
   protecting, by the processing device, the memory page from being accessed by the guest operating system;
   checking the locking indicator associated with the memory page, the locking indicator residing in the shared memory accessible by the guest operating system;
   responsive to determining that the locking indicator indicates that the memory page is not in a locked state, accessing the memory page; and
   responsive to accessing the memory page, re-enabling access to the memory page for the guest operating system.

2. The method of claim 1, wherein accessing the memory page comprises evicting the memory page from a memory.

3. The method of claim 1, wherein the bit in the page table entry indicates that the memory page is read only.

4. The method of claim 3, wherein re-enabling access to the memory page comprises clearing the bit in the page table entry associated with the memory page.

5. The method of claim 1, further comprising responsive to determining that the locking indicator indicates that the memory page is in a locked state, skipping access to the memory page.

6. The method of claim 5, further comprising:
   rechecking the locking indicator associated with the memory page; and
   responsive to determining that the locking indicator indicates that the memory page is not in a locked state, accessing the memory page.

7. The method of claim 5, further comprising: responsive to a guest exit indicator, accessing the memory page.

8. The method of claim 5, wherein accessing the memory page comprises copying data out from contents of the memory page.

9. A system comprising:
   a memory comprising a shared memory that is shared with a guest operating system of a virtual machine; and
   a processing device, operatively coupled to the memory, to:
   accept, from the guest operating system, a lock of a memory page located in the shared memory, wherein to accept the lock comprises to allow the guest operating system to set a locking indicator associated with the memory page without performing a virtual machine exit to the system, and wherein the locking indicator comprises a bit in a page table entry associated with the memory page, wherein the page table entry is of a page table of a host computer system;

protect the memory page from being accessed by the guest operating system;

check the locking indicator associated with the memory page, the locking indicator residing in the shared memory;

responsive to determining that the locking indicator indicates that the memory page is not in a locked state, access the memory page; and responsive to access of the memory page, re-enable access to the memory page for the guest operating system.

10. The system of claim 9, wherein to access the memory page the processing device to evict the memory page from the shared memory.

11. The system of claim 9, wherein the bit in the page table entry indicates that the memory page is read only.

12. The system of claim 11, wherein to re-enable access to the memory page the processing device to clear the bit in the page table entry associated with the memory page.

13. The system of claim 9, wherein responsive to determining that the locking indicator indicates that the memory page is in a locked state, the processing device to skip access to the memory page.

14. The system of claim 13, wherein the processing device is further to:

recheck the locking indicator associated with the memory page; and responsive to determining that the locking indicator indicates that the memory page is not in a locked state, access the memory page.

15. The system of claim 13, wherein the processing device is further to, responsive to a guest exit indicator, access data in the memory page.

16. A non-transitory computer-readable storage medium comprising instructions that when executed by a processing device, cause the processing device to:

accept, from a guest operating system of a virtual machine running on a host computer system, a lock of a memory page located in memory shared with the guest operating system, wherein to accept the lock comprises to allow the guest operating system to set a locking indicator associated with the memory page without exiting to the host computer system, and wherein the locking indicator comprises a bit in a page table entry associated with the memory page, wherein the page table entry is of a page table of the host computer system;

protect the memory page from being accessed by the guest operating system;

check a locking indicator associated with the memory page, the locking indicator residing in the shared memory;

responsive to determining that the locking indicator indicates that the memory page is not in a locked state, access the memory page; and responsive to access of the memory page, re-enable access to the memory page for the guest operating system.

17. The non-transitory computer-readable storage medium of claim 16, wherein executable instructions to access the memory page comprise executable instructions causing the processing device to evict the memory page from memory.

18. The transitory computer-readable non-transitory storage medium of claim 16, wherein the bit in the page table entry indicates that the memory page is read only.

19. The non-transitory computer-readable non-transitory storage medium of claim 18, wherein executable instructions to re-enable access to the memory page comprise executable instructions causing the processing device to clear the bit in the page table entry associated with the memory page.

20. The non-transitory computer-readable non-transitory storage medium of claim 19, wherein the executable instruction cause the processing device to responsive to determining that the locking indicator indicates that the memory page is in a locked state, skip access to the memory page.

* * * * *